United States Patent
Khan et al.

(10) Patent No.: US 11,818,419 B2
(45) Date of Patent: Nov. 14, 2023

(54) MOBILE DEVICE CONTENT PROVISIONING ADJUSTMENTS BASED ON WIRELESS COMMUNICATION CHANNEL BANDWIDTH CONDITION

(71) Applicant: Apple Inc., Cupertino, CA (US)

(72) Inventors: Moinul H. Khan, San Jose, CA (US); Katharina Buckl, Los Altos, CA (US); Venu M. Duggineni, Santa Clara, CA (US); Aleksandr M. Movshovich, Santa Clara, CA (US); Sreeraman Anantharaman, Los Altos, CA (US); Phillip N. Smith, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/586,522

(22) Filed: Sep. 27, 2019

(65) Prior Publication Data
US 2020/0107068 A1    Apr. 2, 2020

Related U.S. Application Data

(60) Provisional application No. 62/738,890, filed on Sep. 28, 2018.

(51) Int. Cl.
*H04N 21/435* (2011.01)
*H04N 21/431* (2011.01)
(Continued)

(52) U.S. Cl.
CPC ....... *H04N 21/4355* (2013.01); *H04N 21/431* (2013.01); *H04N 21/4402* (2013.01);
(Continued)

(58) Field of Classification Search
CPC ............. H04N 21/4355; H04N 21/431; H04N 21/44008; H04N 21/44209; H04N 21/4621; H04N 21/4402
See application file for complete search history.

(56) References Cited

U.S. PATENT DOCUMENTS 6,970,506 B2   11/2005  Kim
7,076,108 B2    7/2006  Huang
(Continued)

FOREIGN PATENT DOCUMENTS

CN   101222296 A   7/2008
CN   106408502 A   2/2017
(Continued)

OTHER PUBLICATIONS

Wang, et al., "Foveation Scalable Video Coding with Automatic Fixation Selection," IEEE Transactions on Image Processing, vol. 12, No. 2, 2003.
(Continued)

*Primary Examiner* — Yassin Alata
(74) *Attorney, Agent, or Firm* — Blank Rome LLP

(57) ABSTRACT

A mobile device includes a display, at least one sensor, and a wireless transceiver. The mobile device also includes control circuitry coupled to the display, the at least one sensor, and the wireless transceiver. The control circuitry is configured to obtain content primitives from the at least one sensor, to perform content provisioning operations to obtain content based at least in part on the content primitives, and to display the obtained content on the display, wherein at least some of the content is virtual content. In response to a bandwidth condition of the wireless communication channel being less than a threshold, the control circuitry is configured to perform adjusted content provisioning operations that involve increasing an amount of image processing operations performed by the mobile device to obtain the content.

26 Claims, 13 Drawing Sheets

(51) Int. Cl.
  *H04N 21/44* (2011.01)
  *H04W 28/02* (2009.01)
  *H04N 21/442* (2011.01)
  *H04N 21/462* (2011.01)
  *H04N 21/4402* (2011.01)

(52) U.S. Cl.
  CPC . *H04N 21/44008* (2013.01); *H04N 21/44209* (2013.01); *H04N 21/4621* (2013.01); *H04W 28/0215* (2013.01); *H04W 28/0268* (2013.01)

(56) References Cited

U.S. PATENT DOCUMENTS

| | | | |
|---|---|---|---|
| 8,471,783 | B2 | 6/2013 | Rhodes |
| 9,606,363 | B2 | 3/2017 | Zalewski |
| 2007/0053428 | A1* | 3/2007 | Saleem .................. H04N 19/31 375/240 |
| 2008/0239075 | A1 | 10/2008 | Mehrotra |
| 2013/0147973 | A1 | 6/2013 | Williams |
| 2013/0195119 | A1 | 8/2013 | Huang |
| 2013/0208080 | A1* | 8/2013 | Lukasik ................. H04N 7/152 348/14.09 |
| 2016/0212433 | A1 | 7/2016 | Zhu |
| 2016/0241836 | A1 | 8/2016 | Cole |
| 2017/0103577 | A1 | 4/2017 | Mendhekar |
| 2017/0280166 | A1 | 9/2017 | Walkingshaw |
| 2017/0323158 | A1* | 11/2017 | Gordon .................... G06F 16/58 |
| 2018/0033163 | A1* | 2/2018 | Sugimoto .......... H04N 21/4143 |
| 2018/0070113 | A1 | 3/2018 | Phillips |
| 2018/0132116 | A1* | 5/2018 | Shekhar ................ G01S 5/0027 |
| 2018/0192058 | A1 | 7/2018 | Chen |
| 2018/0227187 | A1* | 8/2018 | Duvanenko ............. H04L 69/04 |
| 2018/0288423 | A1 | 10/2018 | Vembar |
| 2019/0199467 | A1 | 6/2019 | Vu |
| 2019/0356894 | A1 | 11/2019 | Oh |
| 2020/0081524 | A1 | 3/2020 | Schmidt |
| 2020/0090396 | A1* | 3/2020 | Holmes ................... G06F 3/013 |
| 2020/0288164 | A1 | 9/2020 | Lin |
| 2020/0389621 | A1 | 12/2020 | Ryu |

FOREIGN PATENT DOCUMENTS

| | | |
|---|---|---|
| WO | 2017025483 A1 | 2/2017 |
| WO | 2017205794 A1 | 11/2017 |
| WO | 2018106752 A1 | 6/2018 |

OTHER PUBLICATIONS

Ericsson, "CR to CS Multimedia Codec 26.110 for Global Text Telephony in Release 00," Sep. 8, 2000.

* cited by examiner

| | | Max | | Min |
|---|---|---|---|---|
| Channel Bonding | MCS state | Max | | Min |
| | Available PHy Rate (Gbps) | Max | | Min |
| | UPD rate | Max | | Min |
| Single Channel | Available PHy Rate (Gbps) | Max | | Min |
| | UPD Rate | Max | | Min |
| | | ENHANCED | COMPROMISED | STAND-ALONE |
| | | ←——————— FEATURES ———————→ | | |

MOBILE DEVICE CONTENT PROVISIONING ADJUSTMENTS BASED ON WIRELESS COMMUNICATION CHANNEL BANDWIDTH CONDITION

CROSS-REFERENCE TO RELATED APPLICATIONS

The present application claims priority to U.S. Provisional Patent Application No. 62/738,890, filed Sep. 28, 2018.

BACKGROUND

Mobile devices with graphical user interfaces (GUIs) and wireless communication interfaces are widespread. While permanent storage of content to be display on a mobile device is possible, efforts to expand content provisioning to mobile devices via wireless communication channels are ongoing. There are conflicting limitations related to cameras, display quality, content generation, processing speed, wireless communication channel bandwidth, and system cost that have not been adequately resolved. Efforts to improve content provisioning to HMDs or other mobile devices via wireless communication channels are ongoing.

SUMMARY

In accordance with at least one embodiment of the disclosure, a mobile device comprises a display, at least one sensor, and a wireless transceiver. The mobile device also comprises control circuitry coupled to the display, the at least one sensor, and the wireless transceiver. The control circuitry is configured to obtain content primitives from the at least one sensor, to perform content provisioning operations to obtain content based at least in part on the content primitives, and to display the obtained content on the display, wherein at least some of the content is virtual content. In response to a bandwidth condition of the wireless communication channel being less than a threshold, the control circuitry is configured to perform adjusted content provisioning operations that involve increasing an amount of image processing operations performed by the mobile device to obtain the content.

In accordance with at least one embodiment of the disclosure, a method comprises obtaining, by a mobile device, content primitives used to generate content to be displayed by the mobile device. The method also comprises identifying, by the mobile device, a bandwidth condition of a wireless communication channel. In response to the bandwidth condition of the wireless communication channel being less than a threshold, the method comprises increasing, by the mobile device, an amount of image processing operations performed by the mobile device to generate the content. The method also comprises displaying, by the mobile device, the generated content, wherein the generated content includes computer-generated reality (CGR) content.

BRIEF DESCRIPTION OF THE DRAWINGS

For a detailed description of various examples, reference will now be made to the accompanying drawings in which:

FIG. 2 is a chart showing mobile device features relative to bandwidth conditions of a wireless communication channel in accordance with various embodiments;

DETAILED DESCRIPTION

Figure 1:
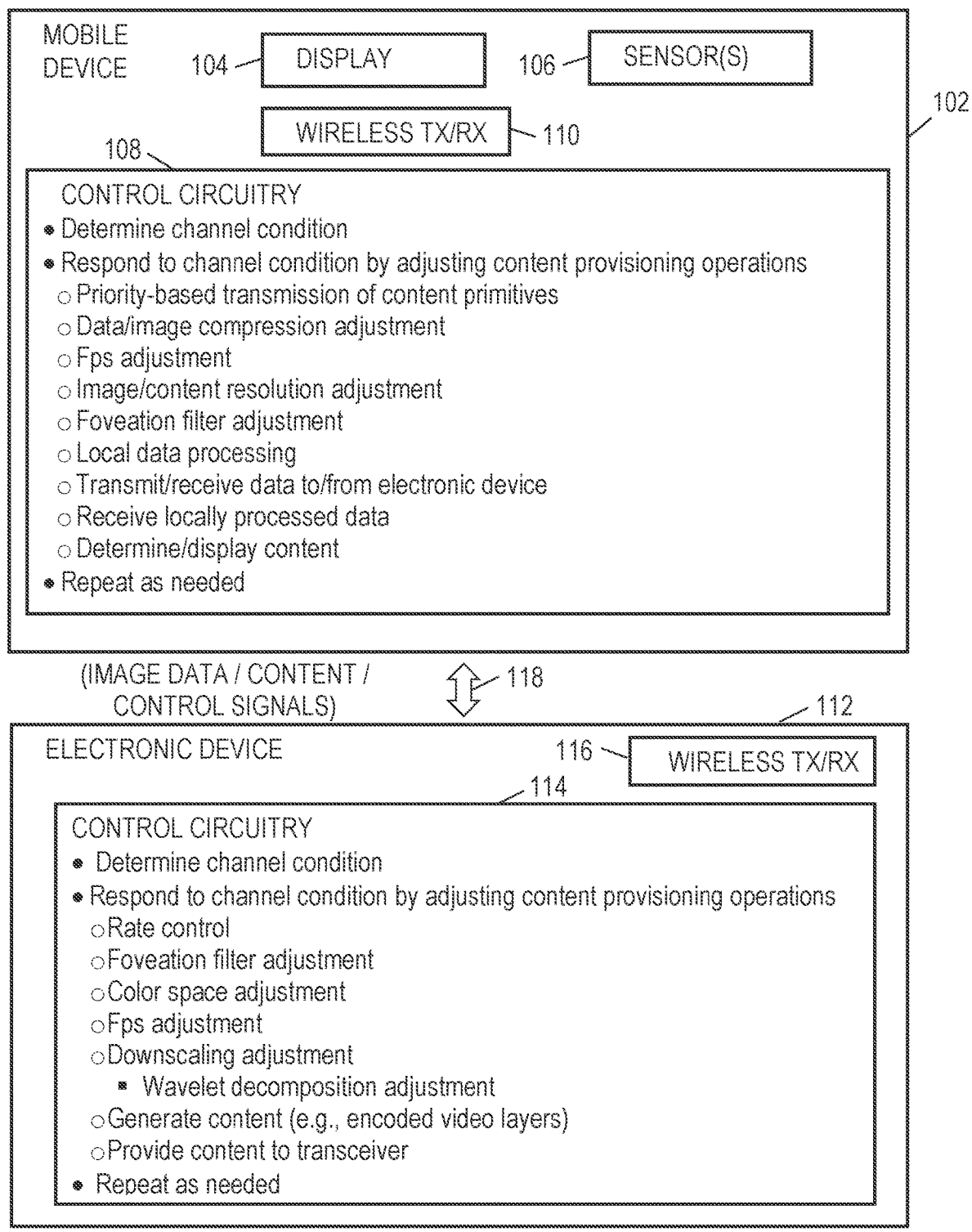
FIG. 1 is a block diagram showing a system in accordance with various embodiments.

Disclosed herein are content display devices, systems, and related methods with content provisioning adjustments based on a wireless communication channel bandwidth condition.

In some embodiments, an example content display system includes a mobile device (e.g., a handheld or head-mounted device) and an electronic device (e.g., a desktop computer, laptop computer, a base station or other electronic device) in communication via a wireless communication channel. Over time, the condition of the wireless communication channel bandwidth varies, which affects the amount of data that can be conveyed from the mobile device to the electronic device or vice versa. In response to detected changes in the wireless communication channel bandwidth, content provisioning operations of the mobile device and the electronic device are updated.

In some embodiments, in response to a bandwidth condition of the wireless communication channel being less than a threshold, the content provisioning operations of the mobile device and the electronic device are adjusted by increasing an amount of image processing operations performed by the mobile device and decreasing an amount of content conveyed between the electronic device and the mobile device via the wireless communication channel. Thereafter, in response to a bandwidth condition of the wireless communication channel being greater than a threshold, the content provisioning operations of the mobile device and the electronic device are adjusted by decreasing an amount of image processing operations performed by the mobile device and increasing an amount of content conveyed between the electronic device and the mobile device via the wireless communication channel. Various other content provisioning options and related operations are described herein, where different content provisioning options are used in response to the bandwidth condition of the wireless communication channel (e.g., using one or more bandwidth condition thresholds and/or an amount of time above or below a given bandwidth condition threshold).

Example content provisioning operations performed by the mobile device include, but are not limited to, priority-based transmission of camera images or other content primitives to the electronic device, image/data compression adjustments for images/data to be conveyed to the electronic device via the wireless communication channel, video frames per second adjustments for camera settings and/or captured camera images, image resolution adjustments, foveation filter adjustments, and local data processing adjustments (e.g., changing an amount of image/data processing operations and/or the image/data processing algorithms used). As used herein, "content primitives" refers to any image-based data that can be used to generate content for display. One example of content primitives includes camera image data. In different embodiments, one or more of the content provisioning operations of the mobile device are adjusted based on bandwidth condition thresholds and/or an amount of time above or below a given bandwidth condition threshold Example content provisioning operations performed by the electronic device include, but are not limited to, rate control adjustments for data to be conveyed to the mobile device, foveation filter adjustments, color space adjustments, image/content frames per second adjustments, and downscaling adjustments (e.g., wavelet decomposition adjustments), content generation (e.g., encoded content/video layers), and providing content (e.g., encoded content/video layers) to a mobile device. In different embodiments, one or more of the content provisioning operations of the electronic device are adjusted based on bandwidth condition thresholds and/or an amount of time above or below a given bandwidth condition threshold. To provide a better understanding, various content display devices, systems, and methods involving content provisioning adjustments performed based on the bandwidth condition of a wireless communication channel are described using the figures as follows.

FIG. 1 is a block diagram showing a content display system 100 in accordance with various embodiments. As shown, the content display system 100 includes a mobile device 102 (e.g., a handheld or head-mounted device) and an electronic device 112 in communication with each other via a wireless communication channel 118. More specifically, the mobile device 102 of FIG. 1 includes a display 104, sensor(s) 106 (e.g., cameras or other sensors), a control circuitry 108, and a wireless transceiver 110. In some embodiments, the display 104 is a liquid crystal display (LCD) display, an organic light-emitting diode (OLED) display, or a holographic display. Also, the sensor(s) 106 are configured to capture ambient environment images. Additionally or alternatively, the sensor(s) 106 may capture images of a user's face (e.g., to track facial expressions), eyes, and/or hands (e.g., to track hand motions). Additionally or alternatively, the sensor(s) 106 capture images of a nearby object (e.g., to track object position or motion). The control circuitry 108 of the mobile device 102 performs various operations to adjust content provisioning operations based on the bandwidth condition of the wireless communication channel 118. The control circuitry 108 may also perform other operations. In some embodiments, the control circuitry 108 corresponds to at least one processor and computer-readable medium with software instructions to perform the content provisioning operations described herein.

Example operations of the control circuitry 108 include determining a condition of the wireless communication channel 118, and responding to the determined condition of the wireless communication channel 118 by adjusting content provisioning operations performed by the mobile device 102. In some embodiments, adjustable content provisioning operations of the mobile device 102 include, but are not limited to, priority-based transmission of content primitives (e.g., camera images or other content primitives that can be used to provide content after some processing or other content provisioning operations) to the electronic device 112, image/data compression adjustments for images/data to be conveyed to the electronic device 112 via the wireless communication channel 118, the video frames per second for camera settings and/or captured images, image resolution adjustments, foveation filter adjustments, and local data processing adjustments (e.g., changing an amount of image/data processing operations and/or the image/data processing algorithms used). In different embodiments, one or more of the content provisioning operations of the mobile device 102 are adjusted by the control circuitry 108 based on bandwidth condition thresholds for the wireless communication channel 118 and/or an amount of time above or below a given bandwidth condition threshold for the wireless communication channel 118.

Meanwhile, the electronic device 112 of FIG. 1 includes a control circuitry 114 and a wireless transceiver 116. The control circuitry 114 of the electronic device 112 performs various operations to adjust content provisioning operations based on the bandwidth condition of the wireless communication channel 118. The control circuitry 114 may also perform other operations. In some embodiments, the control circuitry 114 corresponds to at least one processor and computer-readable medium with software instructions to perform the content provisioning operations described herein.

Example operations of the control circuitry 114 include determining a condition of the wireless communication channel 118, and responding to the determined condition of the wireless communication channel 118 by adjusting content provisioning operations performed by the electronic device 112. In some embodiments, adjustable content provisioning operations of the electronic device 112 include, but are not limited to, rate control adjustments for data to be conveyed to the mobile device 102, foveation filter adjustments, color space adjustments, image/content frames per second adjustments, and downscaling adjustments (e.g., wavelet decomposition adjustments), content generation (e.g., encoded content/video layers), and providing content (e.g., encoded content/video layers) to the mobile device 102. In different embodiments, one or more of the content provisioning operations of the electronic device 112 are adjusted based on bandwidth condition thresholds for the wireless communication channel 118 and/or an amount of time above or below a given bandwidth condition threshold for the wireless communication channel 118.

In some embodiments, the operations of the control circuitry 108 and the control circuitry 114 vary depending on the mobile device features in use. Example mobile device features may be based on cameras including, but are not limited to, eye cameras, hand tracking cameras, face cameras, depth cameras, and scene cameras. Example mobile device features based on camera images include, but are not limited to, generating content layers, generating 3D objects, video matting, object tracking (e.g., hand-tracking, eye-tracking, face/expression tracking), and/or other features. In different embodiments, the camera settings (e.g., resolution in ppd or pixels/mm, fps, bit rate) may vary for different features or for different modes of the same mobile device feature. When the bandwidth condition of the wireless communication channel 118 is above a threshold, more features and related uses of cameras is possible, where at least some camera image data used is conveyed from the mobile device 102 to the electronic device 112, and related content is conveyed from the electronic device 112 to the mobile device 102. As the bandwidth condition of the wireless communication channel 118 decreases, the set of features or modes being supported can be adjusted, such that the amount of camera image data conveyed from the mobile device 102 to the electronic device 112 via the wireless communication channel 118 is decreased. Similarly, when the set of features or modes being supported is adjusted due to a deteriorated bandwidth condition of the wireless communication channel, the amount of content data conveyed from the electronic device 112 to the mobile device 102 via the wireless communication channel 118 is decreased. In such case, the content provisioning operations of the mobile device 102 and the electronic device 112 are adjusted such that the overall features being supported is temporarily decreased, which reduces the amount of data conveyed via the wireless communication channel 118 (mobile device to electronic device, or electronic device to mobile device).

In one example, the mobile device 102 includes a plurality of sensors 106. In response to a bandwidth condition of the wireless communication channel 118 being less than a threshold, adjusted content provisioning operations of the mobile device 102 involve adjusting the operation of the sensors 106, adjusting settings of sensor data captured by the sensors 106, and/or omitting conveyance of at some sensor data captured by the sensors 106 based on a sensor or sensor data prioritization scheme. In some examples, adjusted content provisioning operations of the mobile device 102 involve selectively applying a prioritization scheme to image processing operations to be performed by the mobile device 102 or the electronic device 112 and omitting or migrating some of the image processing operations based on the prioritization scheme.

In one example, in response to a bandwidth condition of the wireless communication channel 118 being less than a threshold, adjusted content provisioning operations of the mobile device 102 or the electronic device 112 involve selectively adjusting a quantity of image data processing algorithms to be used by the mobile device 102 or the electronic device 112.

In one example, in response to a bandwidth condition of the wireless communication channel 118 being less than a threshold, adjusted content provisioning adjustments of the mobile device 102 involve selectively adjusting a compression option for image data captured by the sensor(s) 106 and conveyed from the mobile device 102 to the electronic device 112 via the wireless communication channel 118.

In one example, in response to a bandwidth condition of the wireless communication channel 118 being less than a threshold, adjusted content provisioning operations of the mobile device 102 involve selectively adjusting a frames per second for image data captured by the sensor(s) 106 and conveyed from the mobile device 102 to the electronic device 112 via the wireless communication channel 118.

In one example, in response to a bandwidth condition of the wireless communication channel 118 being less than a threshold, adjusted content provisioning operations of the mobile device 102 involve selectively adjusting a resolution option for image data by the sensor(s) 106 and conveyed from the mobile device 102 to the electronic device 112 via the wireless communication channel 118.

In one example, in response to a bandwidth condition of the wireless communication channel 118 being less than a threshold, adjusted content provisioning operations of the mobile device 102 involve selectively adjusting a foveation option for image data captured by the sensor(s) 106 and conveyed from the mobile device 102 to the electronic device 112 via the wireless communication channel 118.

In one example, the sensor(s) 106 include an eye camera. In response to a bandwidth condition of the wireless communication channel 118 being less than a threshold, adjusted content provisioning operations of the mobile device 102 involve the mobile device 102 selectively performing image data processing operations associated with the eye camera. In such case, eye camera data does not need to be conveyed from the mobile device 102 to the electronic device 112, which results in a reduced amount of data being conveyed via the wireless communication channel 118 (mobile device to electronic device, or electronic device to mobile device).

In one example, the sensor(s) 106 include a hand tracking camera. In response to a bandwidth condition of the wireless communication channel being less than a threshold, adjusted content provisioning operations of the mobile device 102 involve the mobile device 102 selectively performing image data processing operations associated with the hand tracking camera. In such case, hand tracking camera data does not need to be conveyed from the mobile device 102 to the electronic device 112, which results in a reduced amount of data being conveyed via the wireless communication channel 118 (mobile device to electronic device, or electronic device to mobile device).

In one example, the sensor(s) 106 include at least one scene camera and at least one face camera. In response to a bandwidth condition of the wireless communication channel being less than a threshold, adjusted content provisioning operations of the mobile device 102 involve the mobile device 102 selectively compressing image data associated with the at least one scene camera more than image data associated with the at least one face camera.

In one example, the sensor(s) 106 include a depth camera, and a scene camera. In response to a bandwidth condition of the wireless communication channel being less than a threshold, adjusted content provisioning operations of the mobile device 102 involve the mobile device 102 selectively adjusting a priority of camera image data associated with the depth camera and the scene camera. In an example prioritization adjustment, some of the data camera image data associated with the depth camera and the scene camera is not conveyed from the mobile device 102 to the electronic device 112 (or is compression more than other types of camera image data), which results in a reduced amount of data being conveyed via the wireless communication channel 118 (mobile device to electronic device, or electronic device to mobile device).

In one example, the sensor(s) 106 include one or more cameras for obtaining head pose tracking data. In response to a bandwidth condition of the wireless communication channel being less than a threshold, adjusted content provisioning operations of the mobile device 102 involve the mobile device 102 selectively processing head pose tracking data and conveying other camera image data to the electronic device 112. In such case, head pose tracking data does not need to be conveyed from the mobile device 102 to the electronic device 112, which results in a reduced amount of data being conveyed via the wireless communication channel 118 (mobile device to electronic device, or electronic device to mobile device).

In one example, the sensor(s) 106 include one or more cameras for obtaining gaze tracking data. In response to a bandwidth condition of the wireless communication channel being less than a threshold, adjusted content provisioning operations of the mobile device 102 involve the mobile device 102 selectively processing gaze tracking data and conveying other camera image data to the electronic device 112. In such case, gaze tracking data does not need to be conveyed from the mobile device 102 to the electronic device 112, which results in a reduced amount of data being conveyed via the wireless communication channel 118 (mobile device to electronic device, or electronic device to mobile device).

In one example, adjusted content provisioning operations of the mobile device 102 involve selectively conveying reduced amounts of captured camera data for matting operations from the mobile device 102 to the electronic device 112 until a threshold channel degradation condition is met, and performing matting operations by the mobile device 102 in response to the threshold channel degradation condition being met. When the mobile device 102 performs matting operations, a reduced amount of data is conveyed via the wireless communication channel 118 (mobile device to electronic device, or electronic device to mobile device).

In one example, adjusted content provisioning operations of the mobile device 102 or the electronic device 112 involve eliminating at least one of 3D room reconstruction operations and object matching operations. By eliminating 3D room reconstruction operations and object matching operations, a reduced amount of data is conveyed via the wireless communication channel 118 (mobile device to electronic device, or electronic device to mobile device).

In one example, the control circuitry 114 for the electronic device 112 and/or the control circuitry 108 for the mobile device 102 is configured to adjust content provisioning operations that affect the content to be displayed on the electronic device 112, where the adjusted content provisioning operations of the electronic device 112 involve different compression options for content data to be conveyed by the transceiver to the mobile device 102 via the wireless communication channel 118. For example, in response to a bandwidth condition of the wireless communication channel 118 being less than a threshold, the control circuitry 108 of the mobile device 102 or the control circuitry 114 for the electronic device 112 adjusts the content provisioning operations of the electronic device 112 by selecting between different channel adaptive rate control options. In another example, in response to a bandwidth condition of the wireless communication channel 118 being less than a threshold, the control circuitry 108 of the mobile device 102 or the control circuitry 114 for the electronic device 112 adjusts content provisioning operations of the electronic device 112 by selecting between different MCS states.

In another example, in response to a bandwidth condition of the wireless communication channel 118 being less than a threshold, the control circuitry 108 of the mobile device 102 or the control circuitry 114 for the electronic device 112 adjusts content provisioning operations of the electronic device 112 by selecting between different foveation filter strength options. In another example, in response to a bandwidth condition of the wireless communication channel 118 being less than a threshold, the control circuitry 108 of the mobile device 102 or the control circuitry 114 for the electronic device 112 adjusts content provisioning operations of the electronic device 112 by selecting between different color space options. In another example, in response to a bandwidth condition of the wireless communication channel 118 being less than a threshold, the control circuitry 108 of the mobile device 102 or the control circuitry 114 for the electronic device 112 adjusts content provisioning operations of the electronic device 112 by selecting between different frame per second options. In another example, in response to a bandwidth condition of the wireless communication channel 118 being less than a threshold, the control circuitry 108 of the mobile device 102 or the control circuitry 114 for the electronic device 112 adjusts content provisioning operations of the electronic device 112 by selecting between different downscaling options.

In some embodiments, the control circuitry 114 for the electronic device 112 selectively combines a plurality of different compression options in response to the bandwidth condition of the wireless communication channel 118 being less than a threshold for a predetermined amount of time, where the plurality of different compression options include data rate options, foveation filter strength options, color space options, frames per second adaptation options, and downscaling options. In one example, the control circuitry 114 for the electronic device 112 adjusts the data rate options as a first priority in response to the bandwidth condition of the wireless communication channel 118 being less than a threshold for a first time interval. Also, the control circuitry 114 for the electronic device 112 adjusts the foveation filter strength options as a second priority in response to the bandwidth condition of the wireless communication channel 118 being less than a threshold for a second time interval greater than the first time interval. Also, the control circuitry 114 for the electronic device 112 adjusts the color space options as a third priority in response to the bandwidth condition of the wireless communication channel 118 being less than a threshold for a third time interval greater than the second time interval. Also, the control circuitry 114 for the electronic device 112 adjusts the frames per second adaptation options as a fourth priority in response to the bandwidth condition of the wireless communication channel 118 being less than a threshold for a fourth time interval greater than the third time interval. Also, the control circuitry 114 for the electronic device 112 adjusts the downscaling options as a fifth priority in response to the bandwidth condition of the wireless communication channel 118 being less than a threshold for a fifth time interval greater than the fourth time interval. Other content provisioning prioritization scheme options, including data compression prioritization options for an electronic device such as the electronic device 112, are possible. Also, dynamic adjustment of content provisioning prioritization scheme options, including data compression prioritization options for an electronic device such as the electronic device 112, are possible. In some examples, dynamic adjustment of content provisioning prioritization scheme options are based on channel condition, user preference, content quality metrics, and/or other criteria. For example, an existing prioritization scheme can be updated to a new prioritization scheme based on the bandwidth condition of a channel, user preference, content quality metrics, and/or other criteria.

FIG. 2 is a chart 200 showing mobile device features relative to bandwidth conditions of a wireless communication channel such as the wireless communication channel 118 of FIG. 1 in accordance with various embodiments. In the chart 200 example modulation and coding scheme (MCS) states and related data rates for single channel and channel bonding scenarios are represented. As the MCS state decreases, the available bandwidth on a wireless communication channel, such as the wireless communication channel 118, decreases. Accordingly, mobile device features range from "enhanced" near maximum MCS state to "compromised" near minimum MCS state as the available bandwidth for conveying information between an electronic device (e.g., the electronic device 112) and a mobile device (e.g., the mobile device 102) becomes more limited.

As an example, with a maximum MCS state, the mobile device 102 is able to transfer a large amount of content primitives (e.g., sensor data, camera image data and/or other data) to the electronic device 112. Also, with maximum MCS state, the electronic device 112 uses the content primitives to prepare and convey a large amount of content data to the mobile device 102. In such case, the content and/or the mobile device features available for use with the content are enhanced. In contrast, with the minimum MCS state, the mobile device 102 is not able to transfer a large amount of content primitives (e.g., sensor data, camera image data and/or other data) to the electronic device 112. Likewise, with the minimum MCS state, the electronic device 112 is unable to convey a large amount of content data to the mobile device 102. In such case, the mobile device 102 prepares more of the content data, but the content and/or the mobile device features available for use with the content are compromised. Below the minimum MCS state, the mobile device 102 transitions to a stand-alone mode, where the mobile device 102 generates in own content. In such case, the content and/or the mobile device features available for use with the content are compromised. In this example, the mobile device 102 is capable of generating content in a stand-alone mode as needed, but the preferred content display scenario involves an exchange of data between the mobile device 102 and the electronic device 112. Thus, as the MCS state increases, the amount of data exchanged between the mobile device 102 and the electronic device 112 increases along the quality of content and/or mobile device features.

Figure 3:
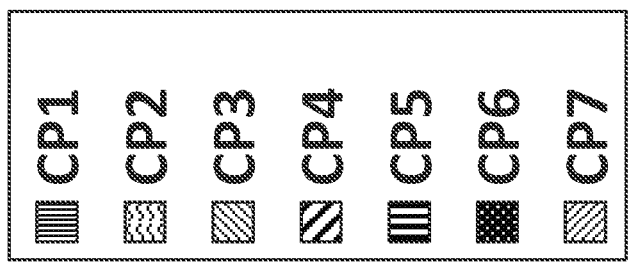
FIG. 3 is a chart showing a baseline distribution of uplink (mobile device to electronic device) bandwidth in accordance with various embodiments.
Figure 3:
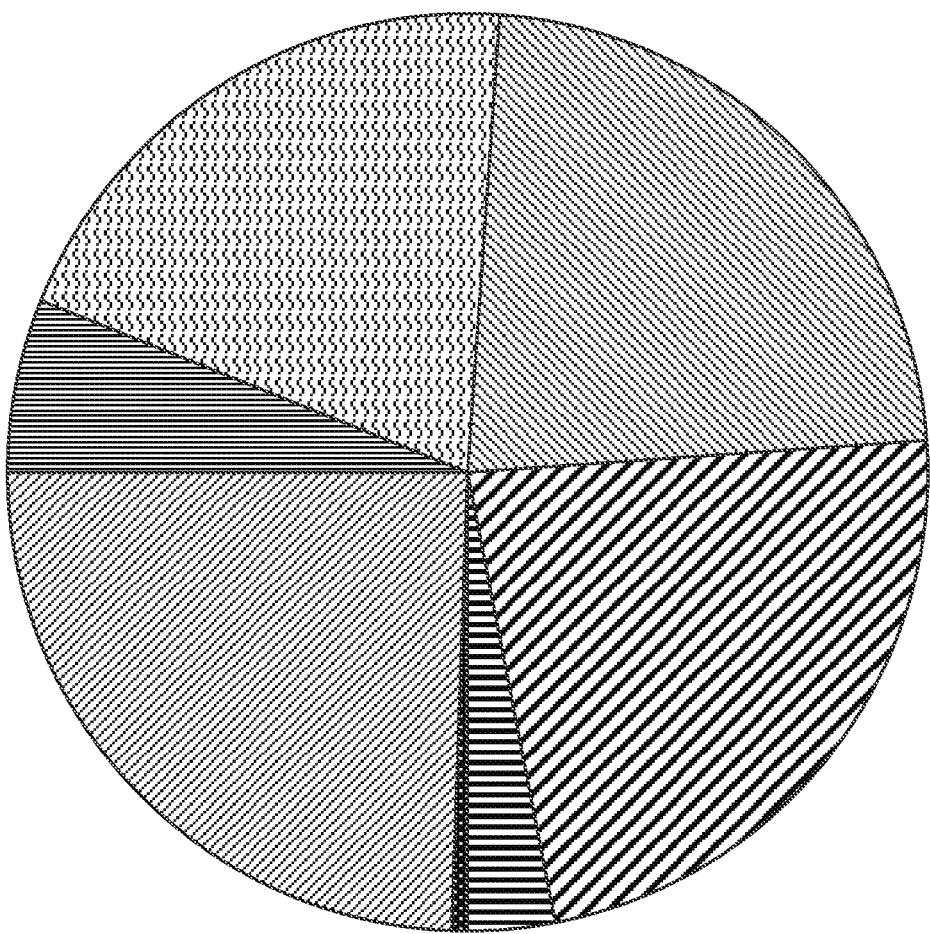

FIG. 3 is a chart 300 showing a baseline distribution of uplink (mobile device to electronic device) bandwidth in accordance with various embodiments. In chart 300, the baseline distribution of uplink bandwidth corresponds to different types of content primitives (e.g., sensor data, camera image data, or other data) provided by a mobile device such as the mobile device 102. In the example of chart 300, different types of content primitives (CP1-CP7) are represented. In one example, CP1-CP7 correspond captured camera image data such as eye camera data, depth camera data, camera data, and scene camera data. In other example, CP1-CP7 correspond to other types of content primitives. In some embodiments, when the bandwidth condition of a wireless communication channel (e.g., the wireless communication channel 118) is above a threshold, the baseline distribution of uplink bandwidth represented in chart 300 is used. Otherwise, when the bandwidth condition of a wireless communication channel (e.g., the wireless communication channel 118) is below the threshold, the distribution of uplink bandwidth varies from what is represented in chart 300. For example, the distribution of uplink bandwidth for certain bandwidth conditions may increase, reduce, or eliminate the bandwidth allocation for one or more types of content primitives.

In some examples, mobile device content provisioning options for the baseline distribution of uplink bandwidth of FIG. 3 involves predetermined settings for the number of cameras used, image height options (e.g., in pixels), image width options (e.g., in pixels), frames per second options (fps), bits per pixel options (bpp), data rate options, and compression options. In response to different bandwidth conditions of a wireless communication channel (e.g., the wireless communication channel 118), the mobile device content provisioning options are adjusted from the predetermined settings of a baseline distribution for uplink bandwidth.

Figure 4:
FIG. 4 is a chart showing a baseline distribution of downlink (electronic device to mobile device) bandwidth in accordance with various embodiments.
Figure 4:
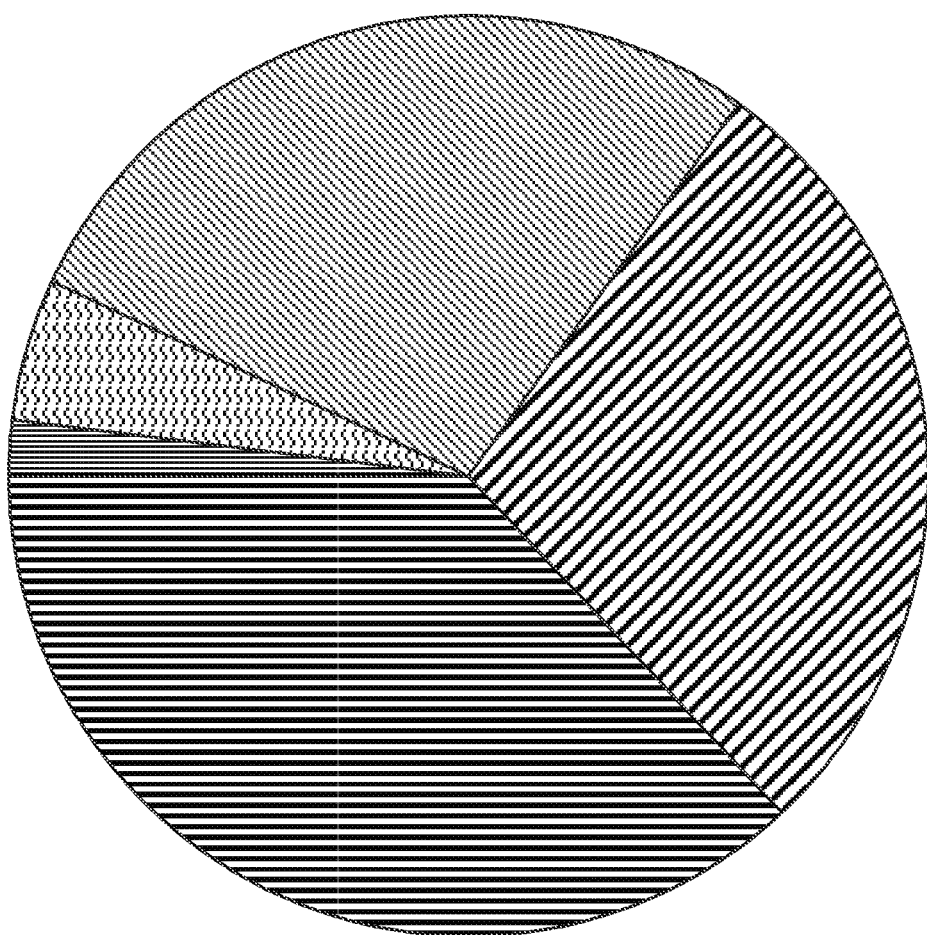

FIG. 4 is a chart 400 showing a baseline distribution of downlink (electronic device to mobile device) bandwidth in accordance with various embodiments. In chart 400, the baseline distribution of downlink bandwidth corresponds to different types of content data provided by an electronic device (e.g., the electronic device 112). In the example of chart 400, the different types of content data include matting program data, secondary display data, layer 0 primary display data, layer 1 primary display data, and layer 2 primary display data. In some embodiments, when the bandwidth condition of a wireless communication channel (e.g., the wireless communication channel 118) is above a threshold, the baseline distribution of downlink bandwidth represented in chart 500 is used. Otherwise, when the bandwidth condition of a wireless communication channel (e.g., the wireless communication channel 118) is below the threshold, the distribution of downlink bandwidth varies from what is represented in chart 500. For example, the distribution of downlink bandwidth for certain bandwidth conditions may increase, reduce, or eliminate the bandwidth allocation for one or more types of content primitives.

In some examples, mobile device content provisioning options for the baseline distribution of downlink bandwidth of FIG. 4 involves predetermined settings for the number of mobile device displays used, image height options (e.g., in pixels), image width options (e.g., in pixels), frames per second options (fps), bits per pixel options (bpp), data rate options, and compression options. In response to different bandwidth conditions of a wireless communication channel (e.g., the wireless communication channel 118), the mobile device content provisioning options are adjusted from the predetermined settings of a baseline distribution for downlink bandwidth.

Figure 5:
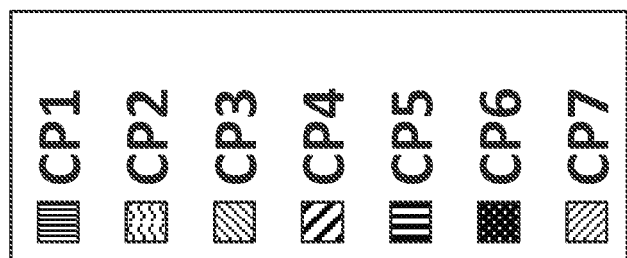
FIG. 5 is a chart showing a baseline distribution of uplink (mobile device to electronic device) bandwidth demand in accordance with various embodiments.
Figure 5:
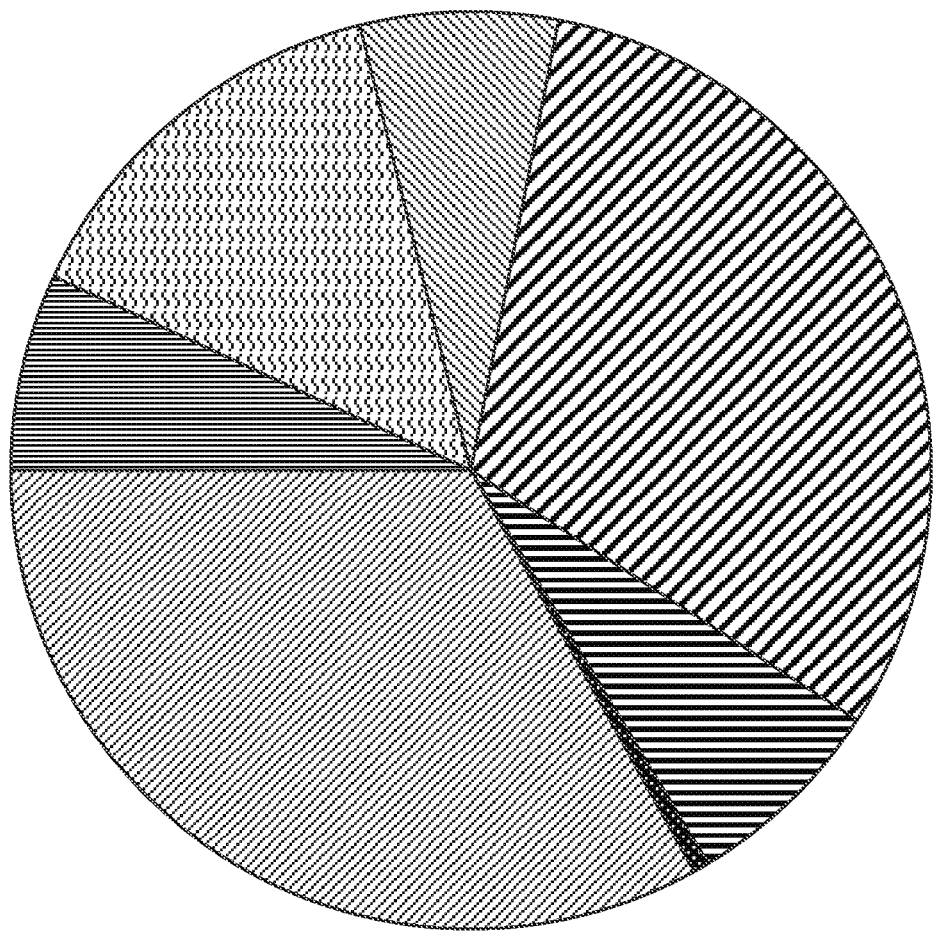

FIG. 5 is a chart 500 showing a baseline distribution of uplink (mobile device to electronic device) bandwidth demand in accordance with various embodiments. In chart 500, the baseline distribution of uplink bandwidth demand corresponds to the uplink bandwidth demand for different types of content primitives (e.g., sensor data, camera image data, and/or other data) obtained by a mobile device such as the mobile device 102. In chart 500, different types of content primitives (CP1-CP7) are represented. In one example, CP1-CP7 correspond to captured camera image data such as eye camera data, depth camera data, and scene camera data, where the uplink bandwidth demand varies for the different types of camera image data. In other example, CP1-CP7 correspond to other types of content primitives. In some embodiments, when the bandwidth condition of a wireless communication channel (e.g., the wireless communication channel 118) is above a threshold, the baseline distribution of uplink bandwidth demand represented in chart 500 is used. Otherwise, when the bandwidth condition of a wireless communication channel (e.g., the wireless communication channel 118) is below the threshold, the distribution of uplink bandwidth demand varies from what is represented in chart 500. For example, the distribution of uplink bandwidth demand for certain bandwidth conditions may increase, reduce, or eliminate the bandwidth demand allocation for one or more types of content primitives.

In some examples, mobile device content provisioning options for the baseline distribution of uplink bandwidth demand of FIG. 5 involves predetermined settings for the number of cameras used, image height options (e.g., in pixels), image width options (e.g., in pixels), frames per second options (fps), bits per pixel options (bpp), data rate options, and compression options. In response to different bandwidth conditions of a wireless communication channel (e.g., the wireless communication channel 118), the mobile device content provisioning options are adjusted from the predetermined settings of a baseline distribution for uplink bandwidth demand.

Figure 6:
FIG. 6 is a chart showing a baseline distribution of downlink (electronic device to mobile device) bandwidth demand in accordance with various embodiments.
Figure 6:
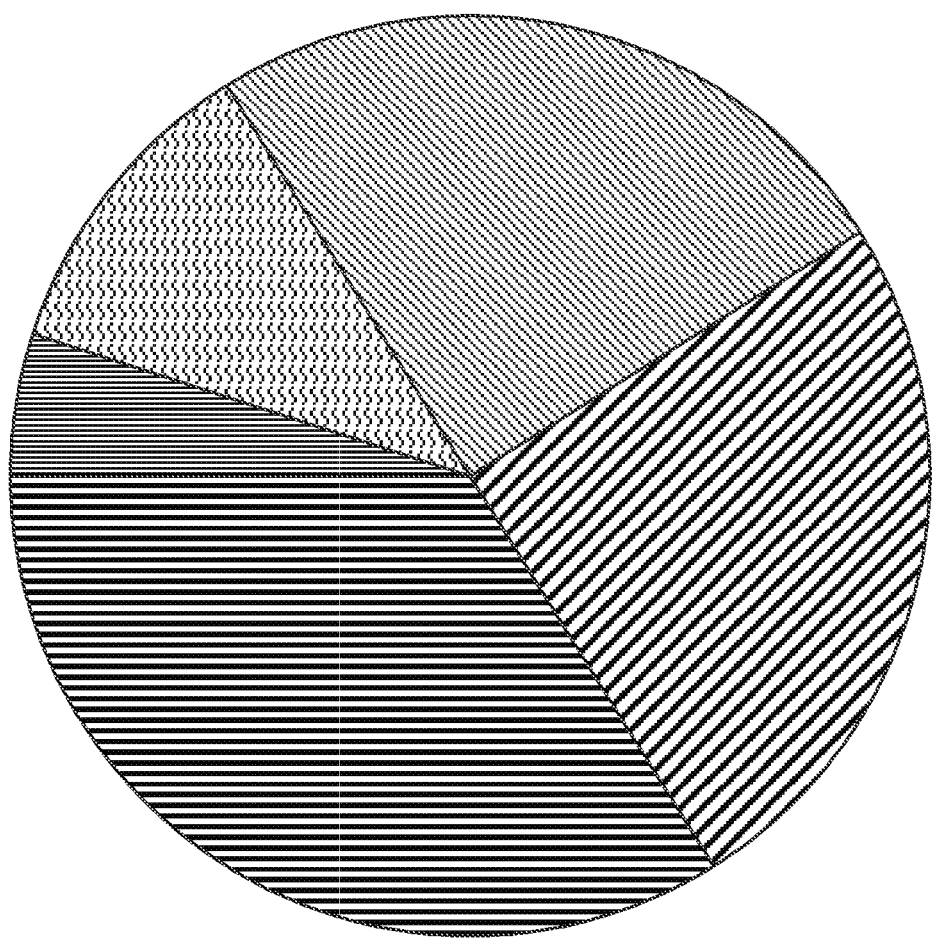

FIG. 6 is a chart 600 showing a baseline distribution of downlink (electronic device to mobile device) bandwidth demand in accordance with various embodiments. In chart 600, the baseline distribution of downlink bandwidth demand corresponds to different types of content data provided by an electronic device (e.g., the electronic device 112). In the example of chart 600, the different types of content data include matting program data, secondary display data, layer 0 primary display data, layer 1 primary display data, and layer 2 primary display data. In some embodiments, when the bandwidth condition of a wireless communication channel (e.g., the wireless communication channel 118) is above a threshold, the baseline distribution of downlink bandwidth demand represented in chart 600 is used. Otherwise, when the bandwidth condition of a wireless communication channel (e.g., the wireless communication channel 118) is below the threshold, the distribution of downlink bandwidth demand varies from what is represented in chart 600. For example, the distribution of downlink bandwidth demand for certain bandwidth conditions may increase, reduce, or eliminate the bandwidth demand allocation for one or more types of content primitives.

In some examples, mobile device content provisioning options for the baseline distribution of downlink bandwidth demand of FIG. 6 involves predetermined settings for the number of mobile device displays used, image height options (e.g., in pixels), image width options (e.g., in pixels), frames per second options (fps), bits per pixel options (bpp), data rate options, and compression options. In response to different bandwidth conditions of a wireless communication channel (e.g., the wireless communication channel 118), the mobile device content provisioning options are adjusted from the predetermined settings of a baseline distribution for downlink bandwidth demand.

Figure 7:
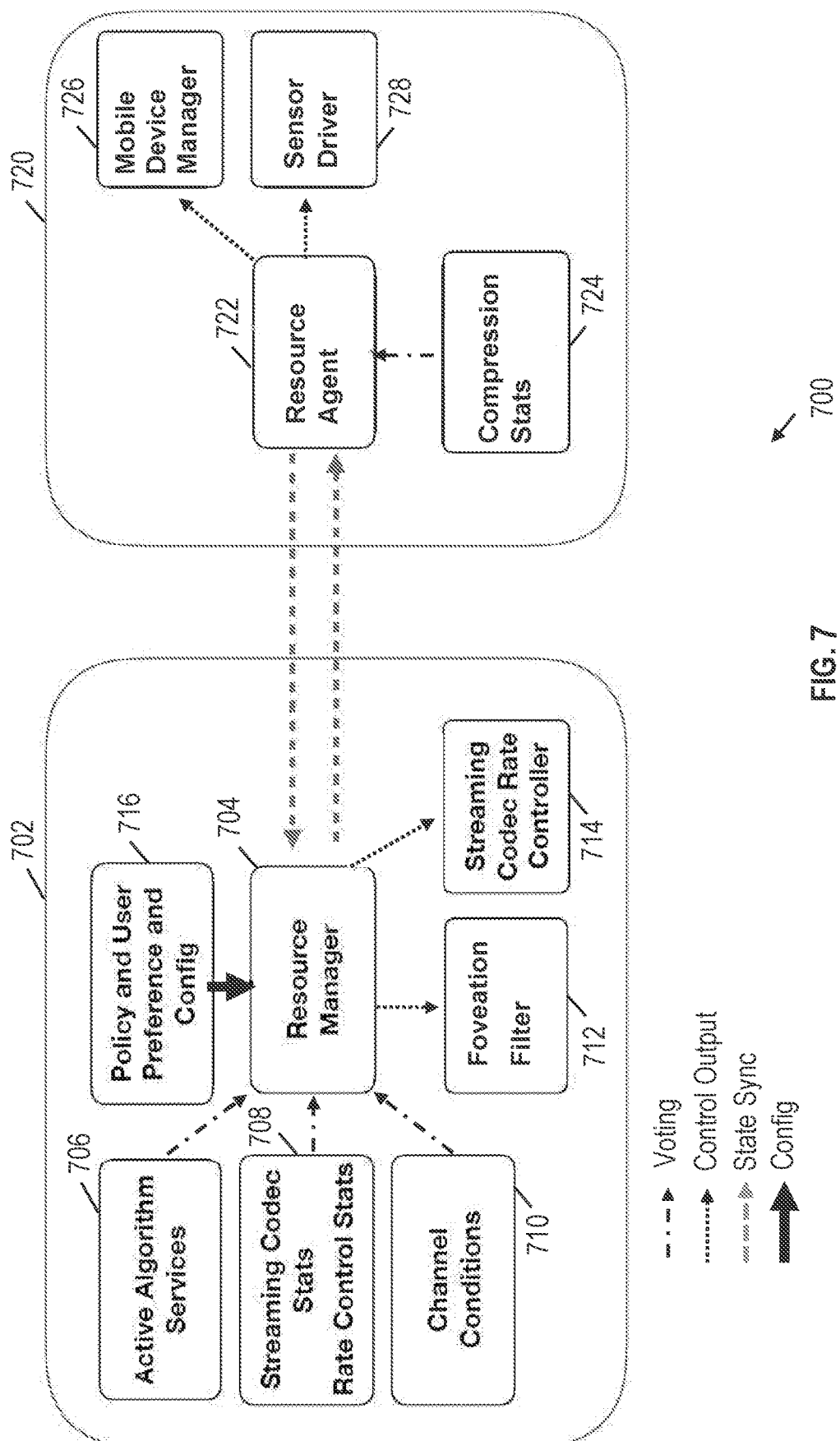
FIG. 7 is a block diagram showing a system for managing content provisioning operations in a mobile device in accordance with various embodiments.

FIG. 7 is a block diagram showing a system 700 for managing content provisioning operations in a mobile device (e.g., mobile device 102) or an electronic device (e.g., electronic device 112) in accordance with various embodiments. The system 700 includes a manager block 702 and an agent block 720. In some embodiments, the manager block 702 with related blocks and/or the agent block 720 with related blocks correspond to software instructions executed by one or more processors. As needed, settings for transceiver components and/or other hardware components are updated based on the operations of the manager block 702 and the agent block 720.

As shown, the manager block 702 includes a resource manager 704 that receives voting results from blocks 706, 708, and 710, where block 706 uses active algorithm services to vote, block 708 uses streaming codec stats and rate control states to vote, and block 710 uses channel conditions to vote. The resource manager 704 also receives policy information, user preferences, and/or configuration information from block 716. Based on the votes from blocks 706, 708, and 710, and/or information/preferences from block 716, the response manager 704 provides control outputs to blocks 712 and 714, where block 712 corresponds to a foveation filter and block 714 corresponds to a streaming codec rate control circuitry 714.

The resource manager 704 is configured to communicate with an agent block 720. More specifically, the resource manager 704 is configured to send state sync signals to and to receive state sync signals from a resource agent 722 of the agent block 720. In response to state sync signals from the resource manager 704 and camera compression stats from block 724, the resource agent 722 provides control outputs to a mobile device manager 726 and a camera driver 728. In some embodiments, the foveation filter 712, the streaming codec rate controller 714, the mobile device manager 726, and the camera driver 728 adjust available content provisioning options of a mobile device or electronic device, such as those described for the control circuitry 108 and the control circuitry 114 in FIG. 1. More specifically, in some embodiments, adjustments to available content provisioning options of a mobile device or electronic device, such as those described for the control circuitry 108 and the control circuitry 114 in FIG. 1, are based on: 1) votes from blocks 706, 708, 710; 2) policy/configuration/user preference information from block 716; and/or 3) compression stats from block 724.

Figure 8:
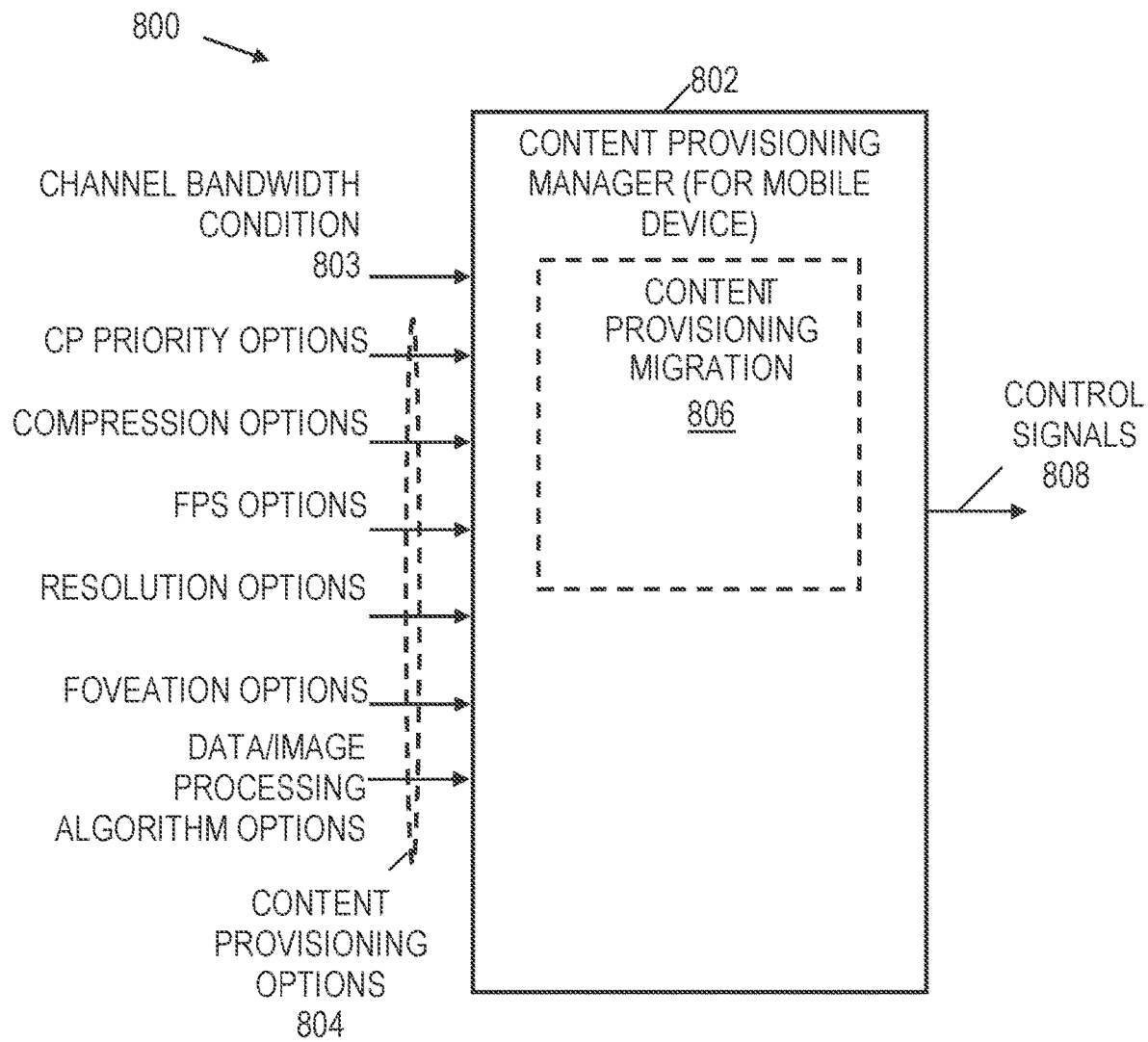
FIG. 8 is a block diagram of a content provisioning manager for a mobile device in accordance with various embodiments.

FIG. 8 is a block diagram of a content provisioning manager 802 for a mobile device in accordance with various embodiments. As shown, the content provisioning manager 802 receives a channel bandwidth condition 803 and content provisioning options 804. The channel bandwidth condition 803 is a current channel bandwidth condition and/or the channel bandwidth condition for a given time interval. In some embodiments, the content provisioning options 804 include, but are not limited to, content primitive prioritization options, data/image compression options, frames per second options, resolution options, foveation options, and data/image processing algorithm options.

In the example of FIG. 8, content provisioning manager 802 includes content provisioning migration information 806 that uses the channel bandwidth condition 803 and the content provisioning options 804 to select content provisioning adjustments, where the adjustments involve transferring at least some content provisioning operations from the electronic device to the mobile device or vice versa. Once the content provisioning adjustments are selected, the content provisioning manager 802 provides control signals 808 to direct components to make the selected content provisioning adjustments.

In some embodiments, the content provisioning manager 802 corresponds to hardware, firmware, and/or software components of a mobile device such as the mobile device 102 of FIG. 1. Additionally or alternatively, the content provisioning manager 802 corresponds to hardware, firmware, and/or software components of an electronic device such as the electronic device 112 of FIG. 1. In some embodiments, the electronic device (e.g., electronic device 112) conveys at least some of the control signals 808 to the mobile device (e.g., mobile device 102) to direct content provisioning adjustments on the mobile device.

Figure 9:
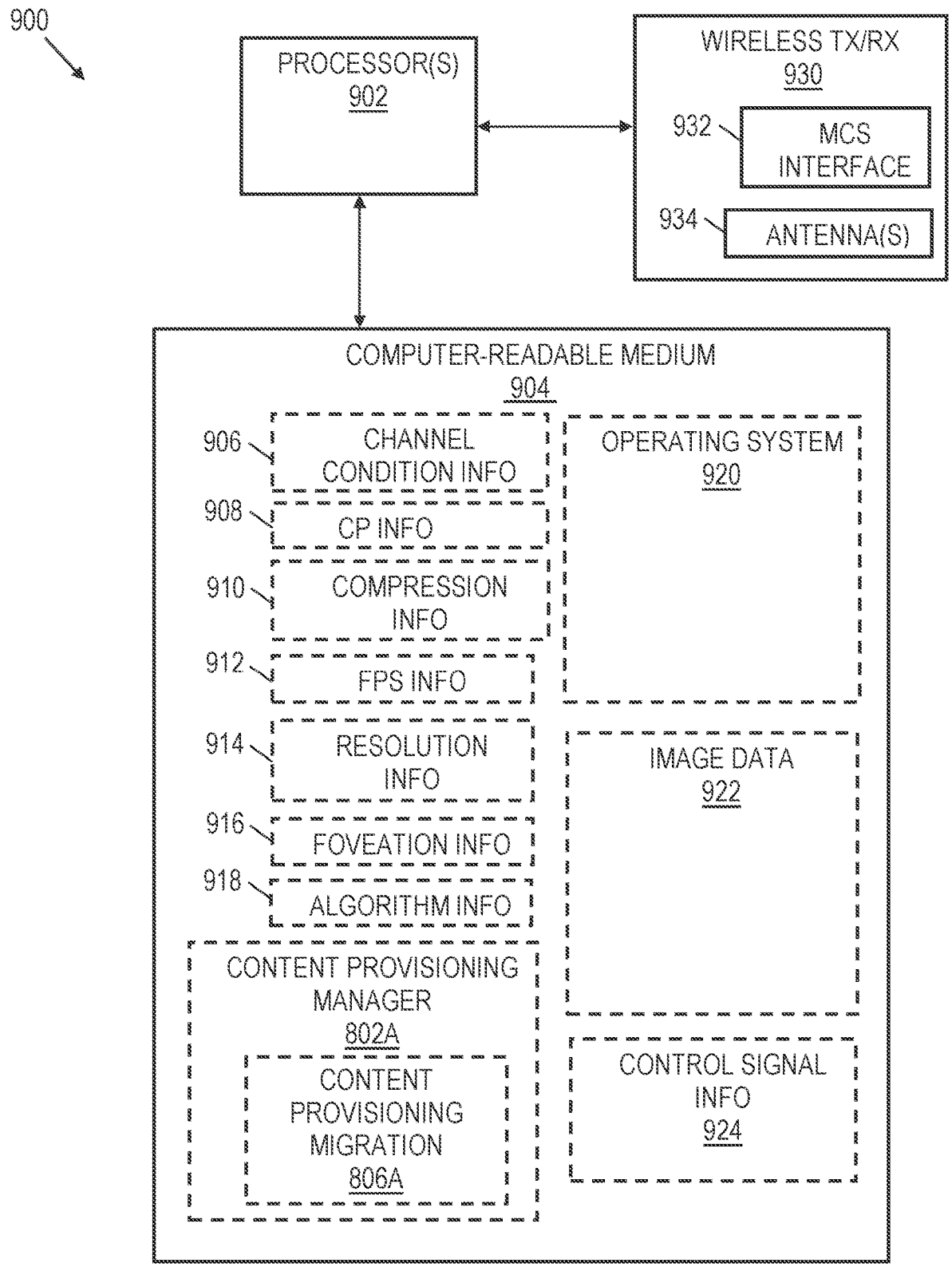
FIG. 9 is a block diagram showing a computer system configured to perform content provisioning operations in accordance with various embodiments.

FIG. 9 is a block diagram showing a computer system 900 configured to perform content provisioning operations in accordance with various embodiments. As shown, the computer system 900 includes processor(s) 902 in communication with a computer-readable medium 904 (e.g., RAM memory, ROM memory, Flash memory, or combinations thereof). In different examples, the processor(s) 902 correspond to one or more central processing units (CPUs), one or more microprocessors, one or more graphics processors, and/or one or more application-specific processors.

In the example of FIG. 9, the computer-readable medium 904 stores data or instructions that, when executed by the processor(s) 902, perform mobile device content provisioning adjustments based on a channel bandwidth condition as described herein. More specifically, the computer-readable medium 904 stores channel condition information 906, which corresponds to instructions, rules, and/or data for determining a channel bandwidth condition. In some embodiments, the channel condition information 906 uses current and/or past channel bandwidth condition statistics (e.g., data rate, dropped packets, MCS states, an amount of time above or below a performance threshold) to determine the channel bandwidth condition.

In the example of FIG. 9, the computer-readable medium 904 also includes various content provisioning options in the form of content primitive information 908, compression information 910, frames per second (fps) information 912, resolution information 914, foveation information 916, and algorithm information 918. More specifically, the content primitive information 908 includes instructions, rules, and/or data for selecting content primitives (e.g., sensor options, camera options and/or camera image settings) in accordance with content provisioning control signals for a mobile device such as the control signals 808. Meanwhile, the compression information 910 includes instructions, rules, and/or data for selecting data/image compression options in accordance with content provisioning control signals for a mobile device such as the control signals 808.

Also, fps information 912 includes instructions, rules, and/or data for selecting fps options in accordance with content provisioning control signals for a mobile device such as the control signals 808. The resolution information 914 includes instructions, rules, and/or data for selecting image/content resolution options in accordance with content provisioning control signals for a mobile device such as the control signals 808. The foveation filter information 916 includes instructions, rules, and/or data for selecting foveation filter options in accordance with content provisioning control signals for a mobile device such as the control signals 808. The algorithm information 918 includes instructions, rules, and/or data for selecting data/image processing algorithm options in accordance with content provisioning control signals for a mobile device such as the control signals 808.

In the example of FIG. 9, the computer-readable medium 904 stores a content provisioning manager 802A, which is an example of the content provisioning manager 802 introduced in FIG. 8. Likewise, the content provisioning migration information 806A is an example of the content provisioning migration information 806 introduced in FIG. 8. In operation, the content provisioning manager 802A provides instructions, rules, and/or data that, when executed by the processor(s) 902, use the available channel bandwidth condition and available content provisioning options to select content provisioning adjustments. Subsequently, control signal information 924 (e.g., instructions, results, and/or data) is executed by the processor(s) 902 to determine control signals to achieve the selected content provisioning adjustments.

In the example of FIG. 9, the computer-readable medium 904 also includes an operating system 920. When executed by the processor(s) 902, the operating system 920 supports various mobile device functions and/or user interface functions, including the content provisioning migration operations described herein. In some embodiments, the operating system 920 includes the content provisioning manager 802A and/or information used to perform content provisioning adjustments (e.g., information 906, 908, 910, 912, 914, 916, 918, and 924).

In one embodiment, the computer system 900 represents components of a mobile device such as the mobile device 102 in FIG. 1. In another embodiment, the computer system 900 represents components of an electronic device in a content display system (e.g., the electronic device 112 in FIG. 1). In some embodiments, both the mobile device 102 and the electronic device 112 include some or all of the components represented in FIG. 9. As desired, some redundancy of components and operations can be performed in a mobile device system to achieve the content provisioning migration operations described herein while accounting for distributed workload options, variable workload scenarios of the electronic device 112, variable workload scenarios of the mobile device 102, and/or varying bandwidth conditions of a wireless communication channel.

Once control signals (e.g., control signals 808) for content provisioning adjustments are determined (e.g., by the processor(s) 902 executing the control signal information 924), these same control signals or related control signals are used internally within the computer system 900 to perform content provisioning migration. Additionally or alternatively, control signals for content provisioning adjustments are transmitted by the computer system 900 to another device (e.g., electronic device to mobile device, or mobile device to electronic device) by a wireless transceiver 930 in communication with the processor(s) 902.

In the example of FIG. 9, the wireless transceiver 930 includes a modulation and coding scheme (MCS) interface 932, which prepares data packets for transmission via antenna(s) 934 to a wireless communication channel such as the wireless communication channel 118 in FIG. 1. As desired, the MCS interface 932 can adjust the modulation and/or coding of content and/or content provisioning control signals in accordance with content provisioning migration operations as described herein.

Figure 10:
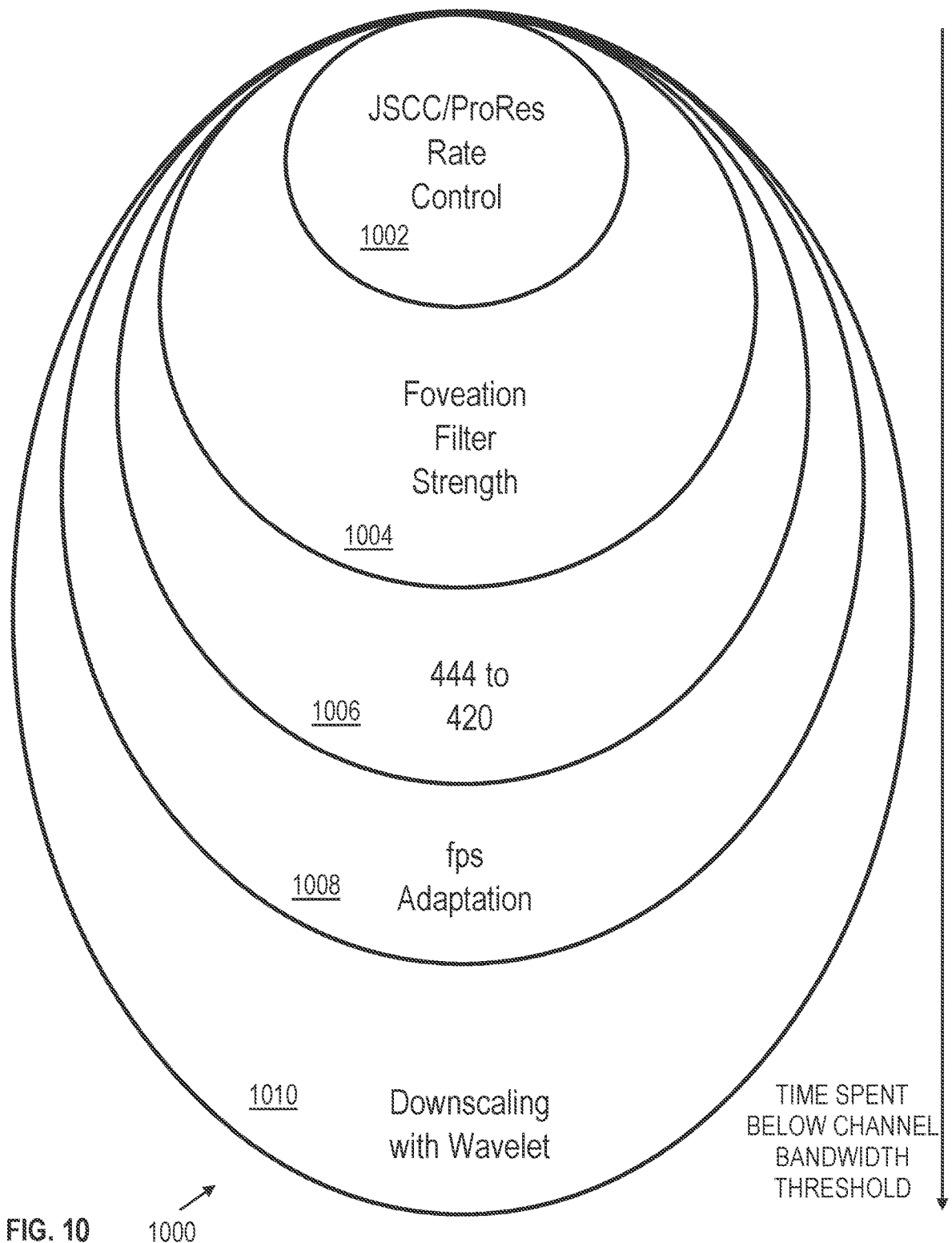
FIG. 10 is a diagram showing downlink (electronic device to mobile device) content provisioning adjustments as a function of a channel bandwidth condition in accordance with various embodiments.

FIG. 10 is a diagram 1000 showing downlink (electronic device to mobile device) content provisioning adjustments as a function of a channel bandwidth condition in accordance with various embodiments. In at least some embodiments, the content provisioning adjustments represented in the diagram 1000 are performed by an electronic device. As shown, the diagram 1000 includes rate control options 1002, foveation filter strength options 1004, color space options 1006, fps adaptation options 1008, and downscaling options 1010. In some embodiments, the options 1002, 1004, 1006, 1008, and 1010 are combined depending on the amount of time spent below a channel bandwidth threshold.

In the example of FIG. 10, the rate control options 1002 include joint source-channel coding (JSCC) options and/or ProRes codec options. In some embodiments, content provisioning adjustments based on a channel bandwidth condition involve one or more adjustments to the rate control options 1002. In one example, adjustments to the rate control options 1002 are initiated when the channel bandwidth condition is less than a threshold level for a first time interval. Thereafter, adjustments to the rate control options 1002 and/or foveation filter strength options 1004 are initiated when the channel bandwidth condition is less than a threshold level for a second time interval that is greater than the first time interval. Thereafter, adjustments to the rate control options 1002, foveation filter strength options 1004, and/or color space options 1006 (e.g., switching between a 444 color space and a 420 color space) are initiated when the channel bandwidth condition is less than a threshold level for a third time interval that is greater than the second time interval. Thereafter, adjustments to the rate control options 1002, foveation filter strength options 1004, color space options 1006, and/or fps adaptation options 1008 are initiated when the channel bandwidth condition is less than a threshold level for a fourth time interval that is greater than the third time interval. Thereafter, adjustments to the rate control options 1002, foveation filter strength options 1004, color space options 1006, fps adaptation options 1008, and/or downscaling options 1010 (e.g., wavelet options) are initiated when the channel bandwidth condition is less than a threshold level for a fifth time interval that is greater than the fourth time interval. If the channel bandwidth condition improves, the options 1002, 1004, 1006, 1008, and 1010 are adjusted to account for the increased bandwidth (e.g., the previous adjustments due to a poor channel bandwidth condition are reversed at once or reversed over time). In other embodiments, the order of content provisioning option adjustments varies from the example of FIG. 10.

Figure 11:
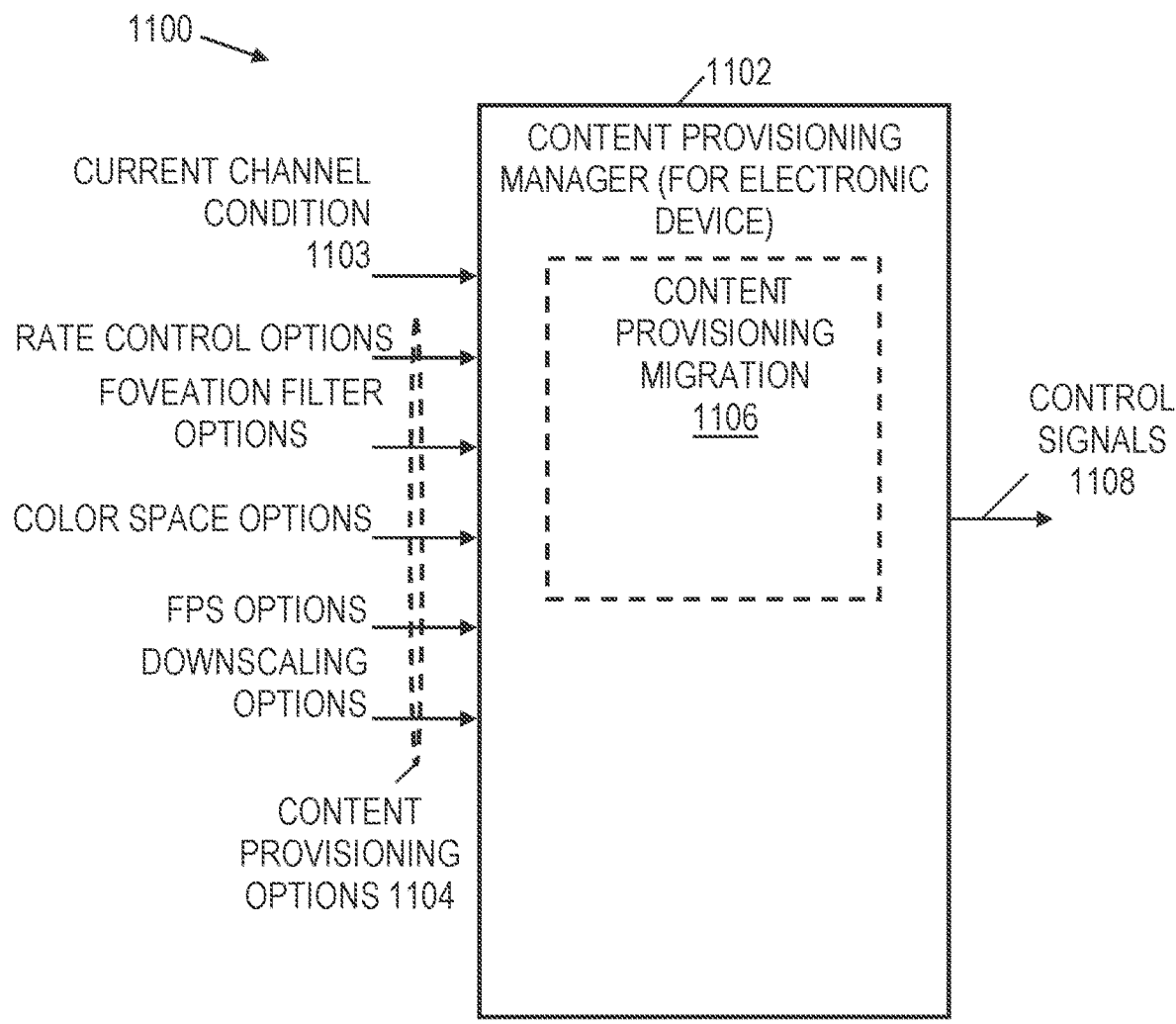
FIG. 11 is a block diagram showing a content provisioning manager for an electronic device in accordance with various embodiments.

FIG. 11 is a block diagram showing a content provisioning manager 1102 for an electronic device in accordance with various embodiments. As shown, the content provisioning manager 1102 receives a channel bandwidth condition 1103 and content provisioning options 1104. The channel bandwidth condition 1103 is a current channel bandwidth condition and/or the channel bandwidth condition for a given time interval. In some embodiments, the content provisioning options 1104 include, but are not limited to, rate control options, foveation filter options, color space options, fps options, and downscaling options.

In the example of FIG. 11, content provisioning manager 1102 includes content provisioning migration information 1106 that uses the channel bandwidth condition 1103 and the content provisioning options 1104 to select content provisioning adjustments, where the adjustments involve transferring at least some content provisioning operations from the electronic device to the mobile device or vice versa. Once the content provisioning adjustments are selected, the content provisioning manager 1102 provides control signals 1108 to direct components to make the selected content provisioning adjustments.

In some embodiments, the content provisioning manager 1102 corresponds to hardware, firmware, and/or software components of an electronic device such as the electronic device 112 of FIG. 1. Additionally or alternatively, the content provisioning manager 1102 corresponds to hardware, firmware, and/or software components of a mobile device such as the mobile device 102 of FIG. 1. In such case, the mobile device (e.g., mobile device 102) conveys at least some of the control signals 1108 to the electronic device (e.g., electronic device 112) to direct content provisioning adjustments on the electronic device.

Figure 12:
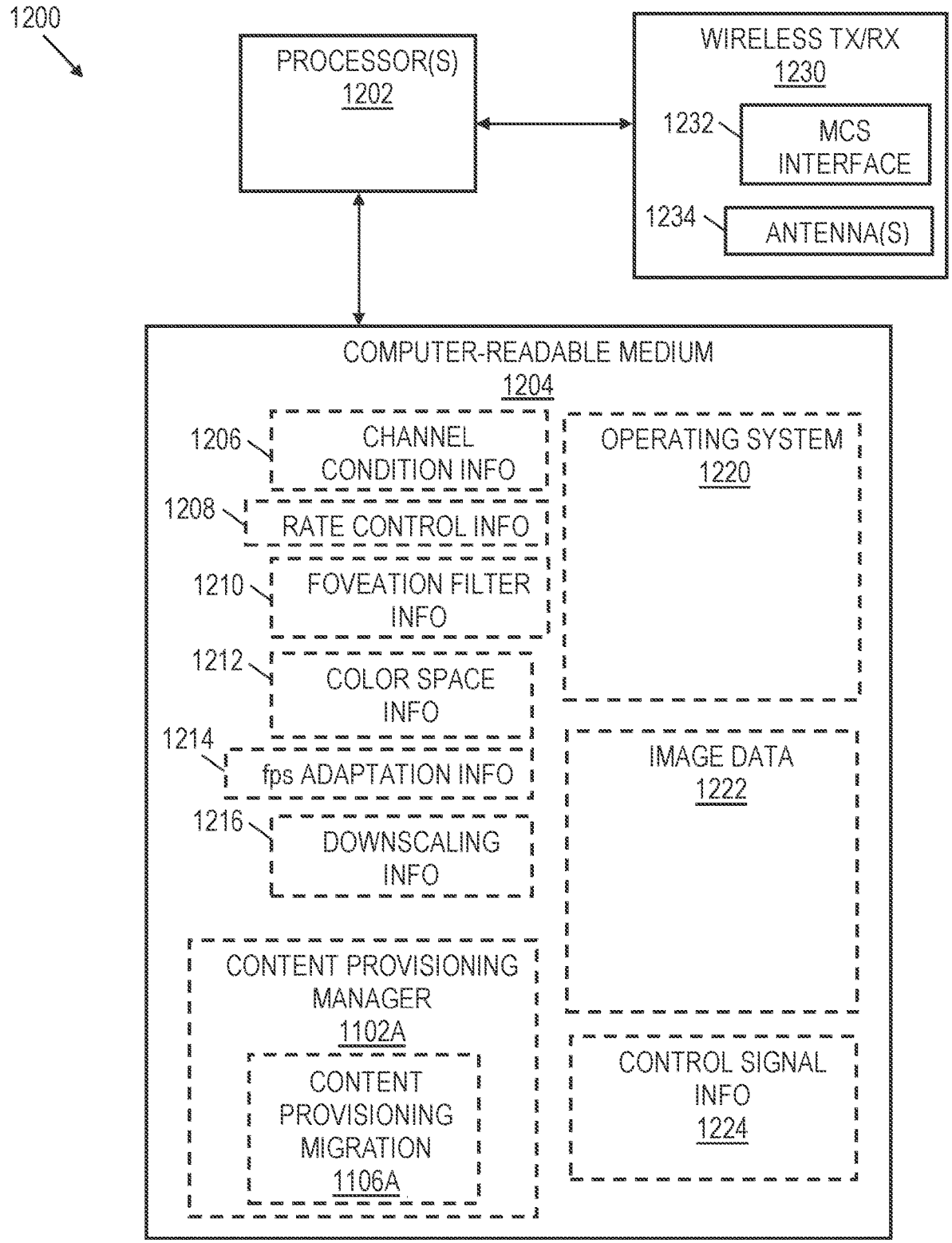
FIG. 12 is a block diagram showing another computer system configured to perform content provisioning operations in accordance with various embodiments.

FIG. 12 is a block diagram showing another computer system 1200 configured to perform content provisioning operations in accordance with various embodiments. As shown, the computer system 1200 includes processor(s) 1202 in communication with a computer-readable medium 1204 (e.g., RAM memory, ROM memory, Flash memory, or combinations thereof). In different examples, the processor(s) 1202 correspond to one or more central processing units (CPUs), one or more microprocessors, one or more graphics processors, and/or one or more application-specific processors.

In the example of FIG. 12, the computer-readable medium 1204 stores data or instructions that, when executed by the processor(s) 1202, perform electronic device content provisioning adjustments based on a channel bandwidth condition as described herein. More specifically, the computer-readable medium 1204 stores channel condition information 1206, which corresponds to instructions, rules, and/or data for determining a channel bandwidth condition. In some embodiments, the channel condition information 1206 uses current and/or past channel bandwidth condition statistics (e.g., data rate, dropped packets, MCS states, an amount of time above or below a performance threshold) to determine the channel bandwidth condition.

In the example of FIG. 12, the computer-readable medium 1204 also includes various content provisioning options in the form of rate control information 1208, foveation filter information 1210, color space information 1212, fps adaptation information 1214, and downscaling information 1216. More specifically, the rate control information 1208 includes instructions, rules, and/or data for selecting rate control settings (e.g., JSCC and/or ProRes settings) in accordance with content provisioning control signals for an electronic device such as the control signals 1108. Meanwhile, the foveation filter information 1210 includes instructions, rules, and/or data for selecting foveation filter options in accordance with content provisioning control signals for an electronic device such as the control signals 1108.

Also, color space information 1212 includes instructions, rules, and/or data for selecting color space options in accordance with content provisioning control signals for an electronic device such as the control signals 1108. The fps adaptation information 1214 includes instructions, rules, and/or data for selecting fps adaptation options in accordance with content provisioning control signals for an electronic device such as the control signals 1108. The downscaling information 1216 includes instructions, rules, and/or data for selecting downscaling options in accordance with content provisioning control signals for an electronic device such as the control signals 1108.

In the example of FIG. 12, the computer-readable medium 1204 stores a content provisioning manager 1102A, which is an example of the content provisioning manager 1102 introduced in FIG. 11. Likewise, the content provisioning migration information 1106A is an example of the content provisioning migration information 1106 introduced in FIG. 11. In operation, the content provisioning manager 1102A provides instructions, rules, and/or data that, when executed by the processor(s) 1202, use the channel bandwidth condition and available content provisioning options to select content provisioning adjustments. Subsequently, control signal information 1224 (e.g., instructions, results, and/or data) is executed by the processor(s) 1202 to determine control signals to achieve the selected content provisioning adjustments.

In the example of FIG. 12, the computer-readable medium 1204 also includes an operating system 1220. When executed by the processor(s) 1202, the operating system 1220 supports various mobile device functions and/or user interface functions, including the content provisioning migration operations described herein. In some embodiments, the operating system 1220 includes the content provisioning manager 1102A and/or information used to perform content provisioning adjustments (e.g., information 1206, 1208, 1210, 1212, 1214, and 1216, and 1224).

In one embodiment, the computer system 1200 represents components of an electronic device such as the electronic device 102 in FIG. 1. In another embodiment, the computer system 1200 represents components of a mobile device in a content display system (e.g., the mobile device 102 in FIG. 1). In some embodiments, both the mobile device 102 and the electronic device 112 include some or all of the components represented in FIG. 12. As desired, some redundancy of components and operations can be performed in a content display system to achieve the content provisioning migration operations described while accounting for distributed workload options, variable workload scenarios of the electronic device 112, variable workload scenarios of the mobile device 102, and/or varying bandwidth conditions of a wireless communication channel.

Once control signals (e.g., control signals 1108) for content provisioning adjustments are determined (e.g., by the processor(s) 1202 executing the control signal information 1224), these same control signals or related control signals are used internally within the computer system 1200 to perform content provisioning migration. Additionally or alternatively, control signals for content provisioning adjustments are transmitted by the computer system 1200 to another device (e.g., electronic device to mobile device, or mobile device to electronic device) by a wireless transceiver 1230 in communication with the processor(s) 1202.

In the example of FIG. 12, the wireless transceiver 1230 includes an MCS interface 1232, which prepares data packets for transmission via antenna(s) 1234 to a wireless communication channel such as the communication channels 118 in FIG. 1. As desired, the MCS interface 1232 can adjust the modulation and/or coding of content and/or content provisioning control signals in accordance with content provisioning migration operations as described herein.

Figure 13:
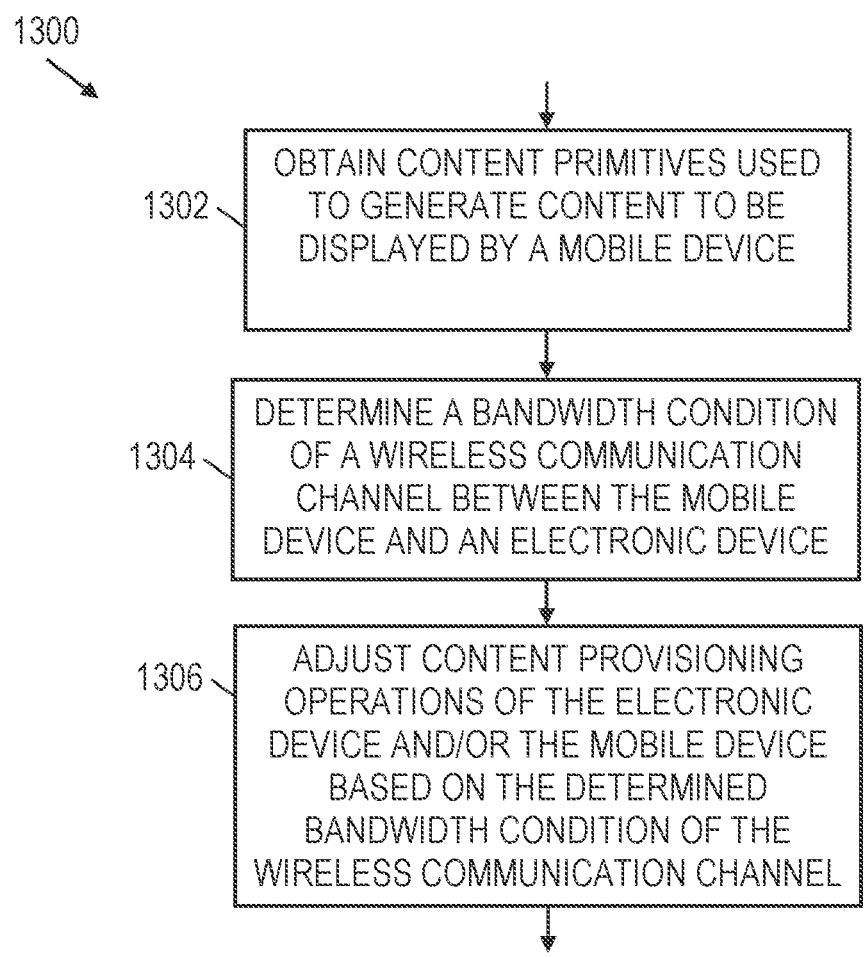
FIG. 13 is a flow chart showing a content provisioning method for a mobile device in accordance with various embodiments.

FIG. 13 is a flow chart showing a content provisioning method 1300 for a content display system in accordance with various embodiments. As shown, the method 1300 comprises obtaining content primitives (e.g., camera images) used to generate content to be displayed by a mobile device at block 1302. At block 1304, a bandwidth condition of a wireless communication channel (e.g., the wireless communication channel between the mobile device and an electronic device) is determined. At block 1306, content provisioning operations of the electronic device and/or the mobile device are adjusted based on the determined bandwidth condition of the wireless communication channel.

In some examples, the content provisioning method 1300 involves mobile device operations at block 1302 including obtaining, by a mobile device, content primitives used to generate content to be displayed by the mobile device. Also, the mobile device operations include identifying, by the mobile device, a bandwidth condition of a wireless communication channel at block 1304. In response to the bandwidth condition of the wireless communication channel being less than a threshold, block 1306 may include the mobile device increasing an amount of image processing operations performed by the mobile device to generate the content. Once the content is generated, the mobile device is able to display the generated content. In some examples, the generated content includes computer-generated reality (CGR) (e.g., augmented reality, mixed reality, virtual reality, and the like) content.

In some examples, the content provisioning method 1300 includes receiving, by an electronic device, content primitives via a wireless communication channel. The method 1300 also includes performing, by the electronic device, content provisioning operations based on the received content primitives, wherein the content provisioning operations involve generating content image data and transmitting the content image data to the wireless communication channel, wherein at least some the content image data corresponds to CGR content. In response to the bandwidth condition of the wireless communication channel being less than a threshold, the method 1300 also includes adjusting the content provisioning operations by decreasing an amount of content image data conveyed to the wireless communication channel.

In one example, in response to the bandwidth condition of the wireless communication channel being less than a threshold, the operations of block 1306 involve adjusting content provisioning operations of the electronic device by decreasing an amount of content data conveyed by the electronic device to the mobile device via the wireless communication channel. Subsequently, if the bandwidth condition of the wireless communication channel improves (e.g., the bandwidth condition is greater than the threshold), the operations of block 1306 involve adjusting content provisioning operations of the electronic device by increasing an amount of content data conveyed by the electronic device to the mobile device via the wireless communication channel.

In some embodiments, the operations of block 1306 involve decreasing or increasing the amount of content data to be conveyed from an electronic device to a mobile device via the wireless communication channel based on different compression options. Example compression options include different channel adaptive rate control options, different MCS states, different foveation filter strength options, different color space options, different frame per second options, and/or different downscaling options. As desired, the use and adjustment of different compression options are selected based on one or more bandwidth condition thresholds such as MCS state, available data rate and/or predetermined time intervals at an MCS state or data rate.

In some embodiments, the operations of block 1306 involve a prioritization scheme to select adjustments. As an example, in some embodiments, adjustments to data rate options, foveation filter strength options, color space options, frames per second adaptation options, and downscaling options are selected based on a predetermined prioritization scheme. In one example, adjusting data rate options is a first priority in response to the bandwidth condition of the wireless communication channel being less than a threshold for a first time interval. Also, adjusting foveation filter rate options is a second priority in response to the bandwidth condition of the wireless communication channel being less than a threshold for a second time interval greater than the first time interval. Also, adjusting the color space options is a third priority in response to the bandwidth condition of the wireless communication channel being less than a threshold for a third time interval greater than the second time interval. Also, frames per second adaptation options is a fourth priority in response to the bandwidth condition of the wireless communication channel being less than a threshold for a fourth time interval greater than the third time interval. Also, adjusting the downscaling options is a fifth priority in response to the bandwidth condition of the wireless communication channel being less than a threshold for a fifth time interval greater than the fourth time interval. In some embodiments, the prioritization scheme is dynamic and adjustable based on user preferences, content quality metrics, and/or other criteria.

In some embodiments, the operations of block 1306 involve decreasing or increasing the amount of content data to be conveyed via the wireless communication channel by increasing an amount of image processing operations performed by the mobile device and decreasing an amount of content conveyed by the electronic device to the mobile device via the wireless communication channel.

Example content provisioning adjustments by a mobile device include, but are not limited to, decreasing an amount of content primitives (e.g., sensor data or camera image data) conveyed from the mobile device to the electronic device, omitting at least some image processing operations performed by at least one of the mobile device and the electronic device, adjusting a quantity of image data processing algorithms to be used by the mobile device or the electronic device, adjusting a compression option for captured image data to be conveyed from the mobile device to the electronic device via the wireless communication channel, adjusting a frames per second for captured image data to be conveyed from the mobile device to the electronic device via the wireless communication channel, adjusting a resolution option for captured image data to be conveyed from the mobile device to the electronic device via the wireless communication channel, and/or adjusting a foveation option for captured image data to be conveyed from the mobile device to the electronic device via the wireless communication channel.

In some embodiments, the operations of block 1306 involve responding to a determination that the wireless communication channel stays less a threshold for multiple time intervals. In response to the bandwidth condition of the wireless communication channel staying less a threshold for multiple time intervals, the amount of content generation operations performed by the mobile device increases for each time interval and the amount of content conveyed by the electronic device to the mobile device decreases for each time interval.

In some embodiments, the operations of block 1306 involve switching image data processing operations associated with an eye camera from the electronic device to the mobile device, switching image data processing operations associated with a hand tracking camera from the electronic device to the mobile device, compressing camera image data associated with the at least one scene camera more than camera image data associated with the at least one face camera, adjusting a priority of camera image data associated with a depth camera and a scene camera of the mobile device, switching processing of head pose tracking data from the electronic device to the mobile device, and/or switching processing of gaze tracking data from the electronic device to the mobile device.

In some embodiments, the operations of block 1306 involve conveying reduced amounts of content primitives (e.g., camera image data) for matting operations from the mobile device to the electronic device until a threshold channel degradation condition is met, and performing matting operations by the mobile device in response to the threshold channel degradation condition being met. In some embodiments, the operations of block 1306 involve eliminating at least some 3D reconstruction operations and/or at least some object matching operations performed by the mobile device or the electronic device.

In some embodiments, the content provision operations of the mobile device and/or the electronic device described herein are employed individually (e.g., only one mobile device adjustment is made, only one electronic device adjustment is made, etc.). In other embodiments, the content provision operations of the mobile device and/or the electronic device described herein are combined in different ways to achieve a desired content quality metric for a given bandwidth condition. For different embodiments, the workload capabilities of the mobile device and/or the electronic device vary, which affects how content provision operations are performed and adjusted in response to the bandwidth condition of a wireless communication channel.

While much of the discussion has been directed to adjusting content provisioning operations of a mobile device and/or electronic device to reduce the amount of content data conveyed via a wireless communication channel in response to a compromised bandwidth condition, it should be appreciated that the bandwidth condition is dynamic. Accordingly, content provisioning adjustments of a mobile device and/or electronic device in response to improvements to the bandwidth condition of a wireless communication channel may also be performed. In some embodiments, control of content provisioning adjustment operations of a mobile device and/or electronic device in response to a dynamic bandwidth condition of a wireless communication channel may be accomplished using a default set of content provisioning operations for each of a plurality of bandwidth conditions. Additionally or alternatively, adjustments to content provisioning operations for different bandwidth conditions of a wireless communication channel is possible based on user preferences, content quality metrics, and/or other criteria.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A mobile device, comprising:
   a display;
   a first camera;
   a second camera oriented differently than the first camera;
   a wireless transceiver adapted to communicate with an electronic device via a wireless communication channel; and
   control circuitry coupled to the display, first and second cameras, and the wireless transceiver, the control circuitry being configured to:
     obtain one or more content primitives from the first camera and the second camera,
     perform content provisioning operations to obtain content based at least in part on the one or more content primitives, cause the wireless transceiver to communicate the one or more content primitives to the electronic device via the wireless communication channel, receive, from the electronic device, processed content that supplements the content provisioning operations, the processed content being based on the one or more content primitives communicated by the mobile device via the wireless communication channel, and display the obtained content on the display, wherein at least some of the displayed content is virtual content, wherein, in response to a bandwidth condition of the wireless communication channel as less than a threshold, the control circuitry is configured to perform adjusted content provisioning operations that involve decreasing an amount of the one or more content primitives transferred to and related processed content received back from the electronic device via the wireless communication channel to obtain the content, and increasing an amount of image processing operations performed by the mobile device to obtain the content.

2. The mobile device of claim 1, wherein the first camera is a scene camera, and the second camera is a gaze tracking camera.

3. The mobile device of claim 1, wherein the adjusted content provisioning operations comprise:
applying a prioritization of image processing operations to be performed by the mobile device on the one or more content primitives from the first camera and the second camera; and
omitting some of the image processing operations based on the prioritization.

4. The mobile device of claim 1, wherein the adjusted content provisioning operations comprise increasing a quantity of image data processing algorithms to be used by the mobile device to obtain content based on the one or more content primitives from the first camera and the second camera.

5. The mobile device of claim 1, wherein the adjusted content provisioning operations comprise applying a compression option for at least some of the one or more content primitives to be conveyed by the wireless transceiver to the wireless communication channel.

6. The mobile device of claim 1, wherein the adjusted content provisioning operations comprise decreasing a frames per second for at least some of the one or more content primitives to be conveyed by the wireless transceiver to the wireless communication channel.

7. The mobile device of claim 1, wherein the adjusted content provisioning operations comprise decreasing a resolution option for at least some of the one or more content primitives to be conveyed by the wireless transceiver to the wireless communication channel.

8. The mobile device of claim 1, wherein the adjusted content provisioning operations comprise adjusting a foveation option for at least some of the one or more content primitives to be conveyed by the wireless transceiver to the wireless communication channel.

9. The mobile device of claim 1, wherein the first camera is a scene camera, and the second camera is a face camera.

10. The mobile device of claim 1, wherein the first camera is a scene camera, and the second camera is a hand tracking camera.

11. The mobile device of claim 1, wherein the adjusted content provisioning operations comprise processing the one or more content primitives from the first camera and conveying the one or more content primitives from the second camera to the wireless communication channel.

12. The mobile device of claim 1, wherein the adjusted content provisioning operations comprise conveying reduced amounts of the one or more content primitives for matting operations to the wireless communication channel until a threshold channel degradation condition is met and performing matting operations by the mobile device in response to the threshold channel degradation condition being met.

13. The mobile device of claim 1, wherein the adjusted content provisioning operations comprise eliminating at least one of 3D room reconstruction operations and object matching operations.

14. The mobile device of claim 1, wherein the control circuitry is further configured to:
detect when the bandwidth condition of the wireless communication channel is less than the threshold; and
decrease an amount of data transmitted to and received from the other electronic device via the wireless communication channel to obtain the virtual content responsive to the bandwidth condition of the wireless communication channel being less than the threshold.

15. The mobile device of claim 1, wherein the control circuitry is configured to support different modes, including a stand-alone mode, to provide virtual content based on the one or more content primitives depending on the bandwidth condition of the wireless communication channel.

16. The mobile device of claim 1, wherein the mobile device is a head-mounted device (HMD) with enhanced features, compromised features, and a stand-alone mode to provide the virtual content based on the one or more content primitives depending on the bandwidth condition of the wireless communication channel.

17. A method, comprising:
obtaining, by a mobile device, one or more content primitives from a first camera and from a second camera oriented differently than the first camera, the one or more content primitives used to generate content to be displayed by the mobile device;
perform, by the mobile device, content provisioning operations to obtain content based at least in part on the one or more content primitives;
communicate, by the mobile device, the one or more content primitives to an electronic device via a wireless communication channel;
receive, by the mobile device and from the electronic device, processed content that supplements the content provisioning operations, the processed content being based on the one or more content primitives communicated by the mobile device via the wireless communication channel;
identifying, by the mobile device, a bandwidth condition of the wireless communication channel;
in response to the mobile device identifying the bandwidth condition of the wireless communication channel as less than a threshold, by the mobile device:
decreasing an amount of the one or more content primitives transferred to and related processed content received back from the electronic device via the wireless communication channel to generate the content, and
increasing an amount of image processing operations performed by the mobile device to generate the content; and displaying, by the mobile device, the generated content, wherein the generated content includes computer-generated reality (CGR) content.

18. The method of claim 17, wherein the first camera is a scene camera, and the second camera is a gaze tracking camera.

19. The method of claim 17, further comprising, in response to the bandwidth condition of the wireless communication channel being less than a threshold, omitting at least some image processing operations performed by the mobile device on the one or more content primitives to generate the content.

20. The method of claim 17, further comprising, in response to the bandwidth condition of the wireless communication channel being less than a threshold, adjusting a compression option for at least some of the one or more content primitives to be conveyed from the mobile device to the wireless communication channel.

21. The method of claim 17, further comprising, in response to the bandwidth condition of the wireless communication channel being less than a threshold, adjusting a frames per second, a resolution option, and a foveation option for at least some of the one or more content primitives to be conveyed from the mobile device to the wireless communication channel.

22. The method of claim 17, further comprising, conveying reduced amounts of the one or more content primitives for matting operations from the mobile device to the wireless communication channel until a threshold channel degradation condition is met, and performing matting operations by the mobile device in response to the threshold channel degradation condition being met.

23. The method of claim 17, further comprising, in response to the bandwidth condition of the wireless communication channel being less than a threshold, eliminating at least some 3D reconstruction operations or at least some object matching operations performed by the mobile device.

24. The method of claim 17, wherein the CGR includes virtual content, the method further comprising:
detecting, by the mobile device, when the bandwidth condition of the wireless communication channel is less than the threshold; and
decreasing, by the mobile device, an amount of data transmitted to and received from the other device via the wireless communication channel to obtain the virtual content responsive to the bandwidth condition of the wireless communication channel being less than the threshold.

25. The method of claim 17, further comprising switching, by the mobile device, between different modes, including a stand-alone mode, to provide virtual content based on the one or more content primitives depending on the bandwidth condition of the wireless communication channel.

26. The method of claim 17, wherein the CGR includes virtual content and the mobile device is a head-mounted device (HMD) with enhanced features, compromised features, and a stand-alone mode to provide the virtual content based on the one or more content primitives depending on the bandwidth condition of the wireless communication channel.

* * * * *